May 3, 1938.  J. T. GONDEK  2,116,146
MARINE ELECTRIC MOTOR
Filed Aug. 27, 1934  3 Sheets-Sheet 1
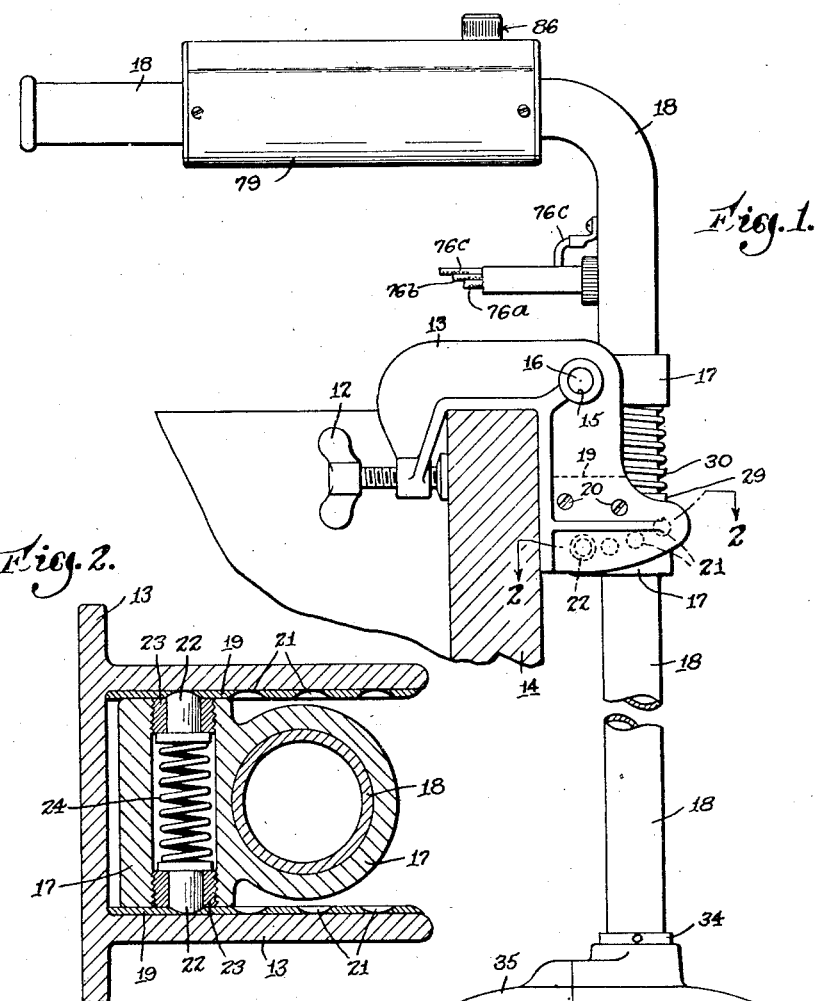
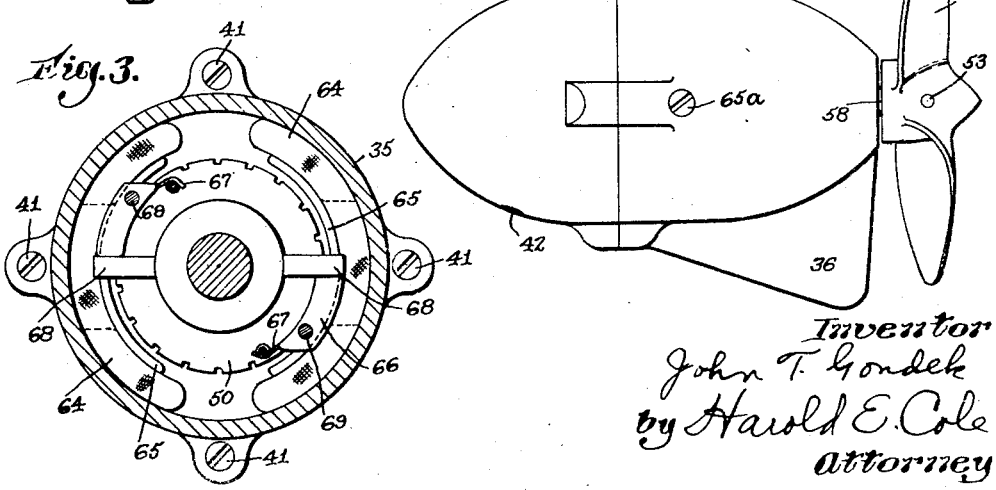
Inventor
John T. Gondek
by Harold E. Cole
Attorney May 3, 1938.  J. T. GONDEK  2,116,146
MARINE ELECTRIC MOTOR
Filed Aug. 27, 1934  3 Sheets-Sheet 2
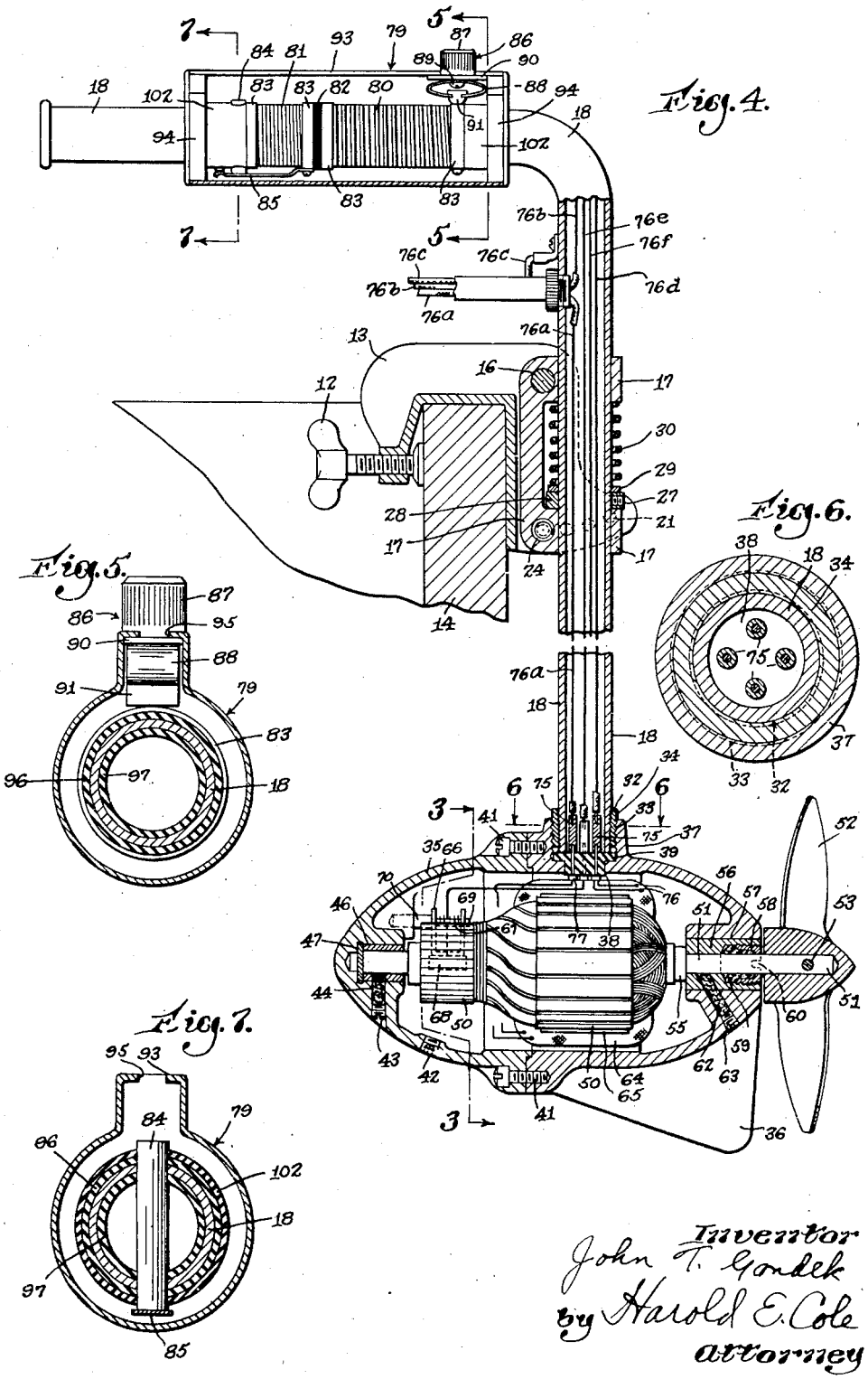
Inventor
John T. Gondek
by Harold E. Cole
Attorney May 3, 1938.   J. T. GONDEK   2,116,146
MARINE ELECTRIC MOTOR
Filed Aug. 27, 1934   3 Sheets-Sheet 3
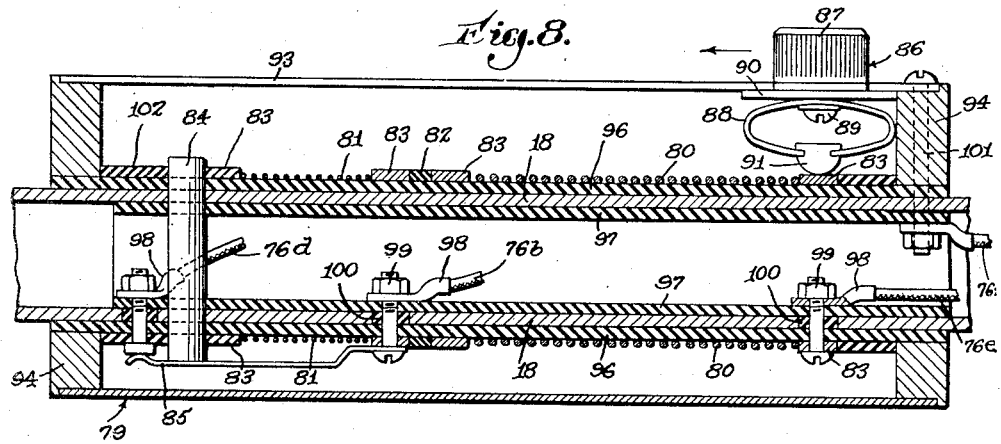
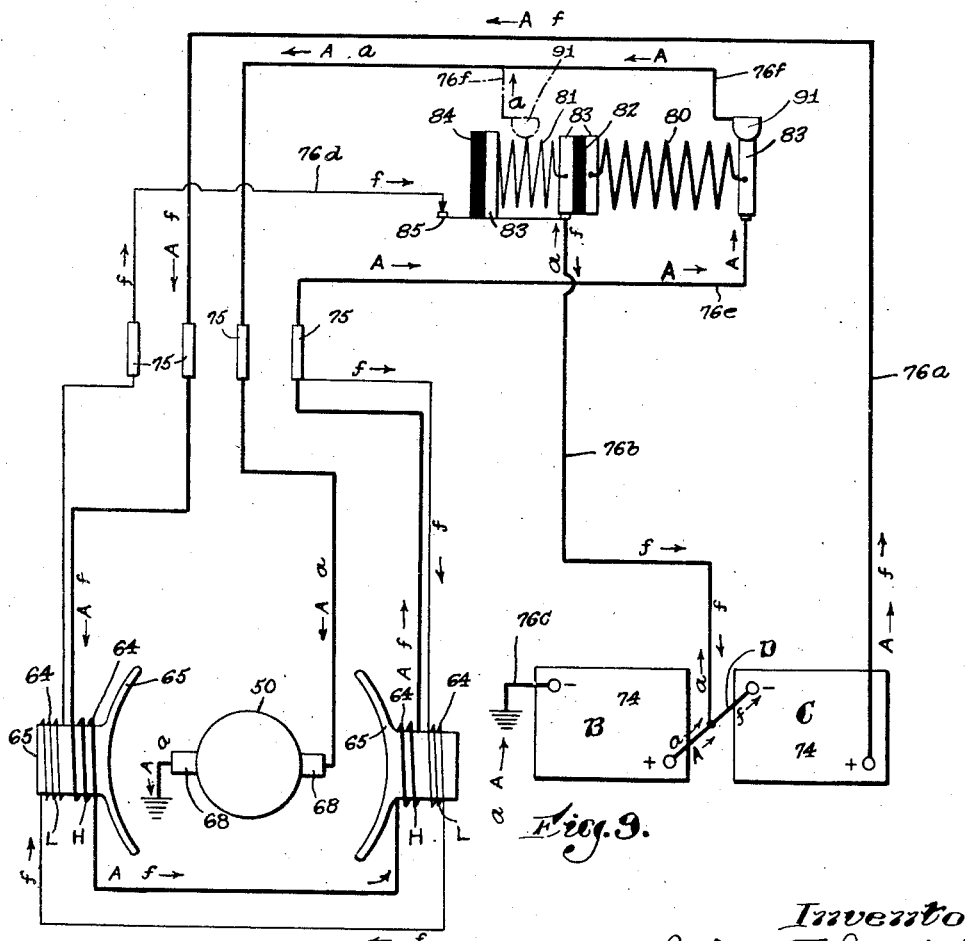
Inventor
John T. Gondek
by Harold E. Cole
Attorney Patented May 3, 1938

2,116,146

UNITED STATES PATENT OFFICE 2,116,146

MARINE ELECTRIC MOTOR

John T. Gondek, St. Paul, Minn.

Application August 27, 1934, Serial No. 741,561

2 Claims. (Cl. 172—239)

This invention relates to a marine electric motor and more particularly to one which may be operated while submerged, and which may be detachably mounted outboard of a boat.

I am well aware that marine motors of this type have been made; but they have made little progress commercially because of the expense of operating them due to waste of electricity, lack of control of the speed, and cost of construction.

One object of my invention is to provide a marine electric motor which is economical to operate, the battery or batteries for which are small enough to be readily moved about by a person, and which have capacity enough to last for a full day's trip or more. Another object is to provide means whereby a fine degree of control over the speed of the boat is possible. Still another object is to provide a construction so simple and inexpensive that my motor can be sold at popular prices. Still another object is to provide mechanism which will enable my motor to automatically move out of contact with obstructions in the water, and which will enable the operator of the boat to readily move the motor to vertical position in cases where the stern of the boat slants, and hold it there and which mechanism makes possible a reverse movement of the boat also.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and, therefore, I am not to be limited to the construction disclosed by the drawings; but am entitled to all such changes therefrom as fall within the scope of my claims.

In the drawings:

Figure 1 is a side elevation view of my marine motor mounted to the stern of a boat.

Figure 2 is a section taken on the line 2—2 of Figure 1, showing details of the mechanism which permits the motor to swing upwardly and be held there.

Figure 3 is a section taken on the line 3—3 of Figure 4, showing a sectional view of the motor showing the brushes.

Figure 4 is a longitudinal sectional view of my marine motor.

Figure 5 is a sectional view taken on the line 5—5 of Figure 4, of my motor controller.

Figure 6 is a sectional view taken on the line 6—6 of Figure 4, illustrating the position of the wires at the entrance to the motor housing.

Figure 7 is a sectional view taken on the line 7—7 of Figure 4, of my motor controller.

Figure 8 is an enlarged sectional view of my motor controller showing the position of the contactor, when operating at full speed.

Figure 9 is a wiring diagram of my motor.

As illustrated, my marine motor, which is portable, is attached to a boat 14 by means of a wing screw 12 passing through a clamp 13 and being tightened against the stern of said boat. My motor is pivotally mounted on said clamp 13, so it may freely swing out of the way of obstructions in the water, the clamp 13 remaining stationary, there being a hole 15 therein into which a pin 16 fits, which pin passes into a bracket 17, so that movement outwardly of said bracket 17 is permitted.

A hollow tube 18 extends all the way from a point above the boat, where its end portion serves as a handle, to the housing for the motor, passing through said bracket 17, and being rotatable therein, so that the motor may be turned 180 degrees when reverse movement of the boat is desired.

The clamp 13 which is made of aluminum because of the lightness of that metal, has side lining plates 19 made of steel or other hard material to resist wear, which are fastened to said clamp by screws 20. Indentures 21 are made in said plates in pairs opposite each other, and as many pairs may be made as are desirable, into which two lock pins 22 at opposite ends may enter. These lock pins extend through short threaded sleeves 23, which sleeves are screwed into said bracket 17, and there is a spring 24 between the two said pins 22 which is held in position under tension. The heads of said pins 22 will abut against the ends of said sleeves 23 to prevent said pins dropping out when they have passed beyond the plates 19. It will be seen from Figure 2 of the drawings, that the pair of said pins 22 in said sleeves 23 together with the said spring 24 between them constitute a means to move and hold my motor in vertical position even though the stern of the boat slants.

To make my motor adjustable vertically, as, for instance, when using it in shallow water, I provide a set screw 27 which screws into a collar 28 that rests on said bracket 17, and then screws against the tube 18 to thereby hold said tube in whatever vertical position is desired.

In order to maintain said tube 18 in whatever steering position is desired and thereby avoid the necessity of always maintaining a grip on the handle end of said tube I provide a coiled spring 30 outside said tube which rests on a metal washer 29 supported by the collar 28, which washer serves as a thrust bearing, the other end of said spring 30 bearing against said bracket 17. Said spring is always under tension so that said tube 18 does not swing involuntarily, due to the friction between the bracket 17 and collar 28.

At the lower end of said tube 18 where it enters the motor housing 35 it is threaded to engage a coupling 34 which is threaded on the inside as at 32 and also on the outside as at 33, the inside thread 32 being relatively fine compared to the outside coarser thread 33, which engages a threaded boss 37 made integral with said motor housing 35. Said tube 18 is connected to the housing 35 by first screwing the coupling 34 on the end of said tube upwardly as far as it will go, whereupon it is screwed downwardly into engagement with said boss 37, the threads between said coupling 34 and said boss 37 being so much coarser than the threads between said tube and said coupling that only a slight downward movement of the coupling on said tube screws said coupling down in said boss as far as it will go.

A fiber insulating button 38, which has a wide top 39, fits into said housing 35 and makes the connection between the tube 18 and the housing 35 air tight, so that air can neither enter nor leave the housing. Said tube 18 contacts tightly with said top 39 of said insulating button and at the same time compresses the under surface of said top tightly against the housing, so that neither water nor air can enter said housing at this joint, nor can air escape.

A rudder 36 is made integral with said housing 35. Screws 41 hold the sections of said motor housing 35 together. An inspection screw plug 42 screws into said housing 35, and makes it possible to test the housing for air pressure in assembling and for any leakage. A screw plug 43 holds oil wicking 44 in a hole in said housing whereby oil is supplied to a bushing 46 on the end of which is a thrust bearing 47.

An armature 50 of well known construction is within said housing 35, and it has a shaft 51 on the end of which a propeller 52 is fastened by a pin 53. Said shaft 51 passes through a shoulder member 55, and then through a bushing 56 which fits into an opening 57 in said housing. Within said bushing 56 is a stuffing box consisting of a gland nut 58 filled with the usual packing 59, there being a slot 60 in said gland nut whereby it may be screwed in or out. Oil wicking 62 lubricates said bushing 56, being held in place by a screw 63. Field coils 64 are held in place by field pieces 65 which are held to said housing 35 by screws 65a. The field coils 64 each consist of a heavy winding H and a light winding L. Between the ends of brush arm 66 to which a brush 68 is fastened is a spring 67 through which a pin 69 passes and on which pin the said arm 66 pivots. An insulator 70 insulates said pin 69 from said housing 35.

At the entrance to the housing 35 are binding posts 75 to which are attached wires 76 through which electrical current is transmitted from the batteries 74. I have given the wires generally the numeral 76, distinguishing certain wires from each other by a letter after the numeral, as will hereinafter appear. Binding post screws 77 pass through the fiber button 38 and enter and become part of the binding posts 75, the wires 76 being soldered to the heads of said screws 77 inside the housing 35, so that said binding posts 75 conduct the current at the entrance to said housing. Inasmuch as the heads of said screws 77 are screwed tight against said fiber button 38 no air can pass between said tube 18 and said housing 35.

In order to identify various sections of wire showing in sectional views of the drawings I have given them different letters as follows: The terminal wires 76a and 76b conduct the current from batteries 74. The ground wire is 76c. The field wire 76d connects with the switch member 85 later described. 76e is a field wire, and 76f is a switch contactor wire.

The motor controller 79, which is operated from the boat, being mounted on the tube 18, controls the speed of the boat by means of a contactor 86 which establishes connections with either a high speed resistance coil 80 which is made of wire of relatively large area in cross section, or with a separate low speed resistance coil 81 which is made of wire of relatively small area in cross section, or stops the boat when moved beyond said low speed resistance coil 81. I provide a fiber switch thrower 84 at this point, so that when said contactor 86 is moved onto it and thereby depresses it the switch member 85 is also depressed to break the field circuit f, which prevents the further flow of electricity through said circuit.

An insulator 82 separates the high speed resistance coil 80 from the low speed resistance coil 81, so that the two coils are separated electrically. Brass rings 83 constitute the ends of said coils 80 and 81 as shown in Figures 8 and 9 of the drawings. Said switch contactor 86, by which the motor is started and stopped and its speed controlled, consists of a button 87 by which said contactor is moved, a spring 88 fastened to the button by a screw 89 which passes through a bearing plate 90 into said button 87. The actual contact with the coils is established by a metal brush 91 to which said spring 88 is connected.

Said motor controller 79 has a metal casing 93 which serves as a conductor to carry current to said switch contactor 86, and has thickened ends 94 also made of metal. A slot 95 is cut in said casing 93 to permit said contactor 86 to be slid along and a little beyond said resistance coils 80 and 81. To start the motor said contactor 86 is moved off said switch thrower 84 onto the end 83 of said low speed resistance coil 81, thereby establishing a circuit through the armature 50 and field coils 64. As the said contactor 86 is moved along said coil 81 the speed of the boat increases, and when further speed is desired said contactor 86 is moved out of contact with coil 81 and into contact with the high speed resistance coil 80, the speed increasing as it is moved across said coil 80 until the maximum is obtained when said contactor 86 is moved into contact with said coil end 83 at the outside end of said coil 80, as illustrated in Figure 9 of the drawings.

Between the resistance coils 80 and 81 and the metal tube 18 is an insulator 96, and there is another insulator 97 within said tube 18.

Terminal connectors 98 are held by bolts 99 which conduct current and which are insulated from said tube 18 by a disk 100. To charge said switch contactor 86 the current passes through the switch contactor wire 76f and through a bolt 101 in one end 94 of said casing and thence passes through a portion of said metal casing 93 to thereby charge said contactor 86. A fiber stop member 102 at one side of said switch thrower 84 limits the downward movement of the said switch thrower.

I have given the battery the numeral 74, and for the purpose of describing the circuits one part of the battery is designated as B and the other part as C which are connected by connector D. Each part must necessarily have at least one cell, and ordinarily it would have three cells, the whole battery having six cells, although the number of cells is a matter of choice.

To make my wiring clear in the drawings I have given the circuits established by my invention the letters A, a, f.

The A circuit is a high speed circuit across battery parts B and C with the heavy field windings H in series with the armature 50, this circuit A being established only through the high speed resistance coil 80. The a circuit is a low speed armature circuit across battery part B which is established only through the low speed resistance coil 81. The f circuit is a field circuit across battery part C which is established whenever said contactor is in contact with either of said resistance coils 80 and 81. Therefore, it will be seen that there are always two circuits established, namely a and f, or A and f, to thereby attain efficiency and economy, although when circuit A is established circuit f could be dispensed with, in which event there would be a lowering in efficiency. By starting from the battery 74 the different circuits can be traced by following their different letters A, a, f. Circuit a is established from battery part B through the low speed resistance coil 81, brush 91 and contactor 86, armature 50 and thence grounding to said battery part B. Circuit f is established from battery part C, through the heavy windings H of field coils 64, to a binding post 75, to the light windings L of field coils 64, to switch member 85 to battery connector D and battery part C. Said heavy and light windings H and L are in series with each other. Circuit A is established from battery part C through the heavy windings H of field coils 64, binding post 75, high speed resistance coil 80, brush 91 and contactor 86, armature 50 and thence grounding to said battery part B.

What I claim is:

1. An electric motor comprising a battery embodying a plurality of cellular structures, an armature, field means embodying heavy windings and light windings, a relatively low speed resistance coil, a relatively high speed resistance coil, a contactor adapted to be moved into contact with said resistance coils, and electricity conducting means connected to said battery structures, armature, field means, resistance coils and contactor, said conducting means embodying parts connecting one of said battery structures through said low speed resistance coil to said armature when said contactor is in contact with said low speed resistance coil to thereby establish a circuit, and parts connecting another of said battery structures with said heavy and with said light field windings to thereby establish a circuit, and parts connecting said battery structures through said heavy field windings through said high speed resistance coil and through said armature when said contactor is in contact with said high speed resistance coil to thereby establish a circuit.

2. An electric motor comprising a battery embodying a plurality of cellular structures, an armature, field means, a relatively low speed resistance coil, a relatively high speed resistance coil, a contactor adapted to be moved into contact with said coils, and electricity conducting means connected to said battery structures, armature, field means, coils and contactor, said conductor means embodying parts connecting in series one of said battery structures through said low speed resistance coil to said armature when said contactor is in contact with said low speed resistance coil to thereby establish a circuit, and parts connecting another of said battery structures with said field means to thereby establish a circuit, and parts connecting in series said plurality of battery structures through said high speed resistance coil, field means and through said armature when said contactor is in contact with said high speed resistance coil to thereby establish a circuit.

JOHN T. GONDEK.